US012269278B2

(12) United States Patent
Propersi Sterbiati et al.

(10) Patent No.: US 12,269,278 B2
(45) Date of Patent: Apr. 8, 2025

(54) SIDE MOUNTING FOR S-SHAPED PRINT HEADS

(71) Applicant: Electronics for Imaging, Inc., Londonderry, NH (US)

(72) Inventors: Ernesto Propersi Sterbiati, Grassobbio (IT); Marco Serafini, Grassobbio (IT)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 95 days.

(21) Appl. No.: 17/931,850

(22) Filed: Sep. 13, 2022

(65) Prior Publication Data

US 2024/0083185 A1 Mar. 14, 2024

(51) Int. Cl.
*B41J 25/34* (2006.01)

(52) U.S. Cl.
CPC .................................... *B41J 25/34* (2013.01)

(58) Field of Classification Search
CPC ...... B41J 25/34; B41J 25/001; B41J 2202/20; B41J 2202/19; B41J 2/01; B41J 2202/21; B41J 2/3359; B41J 2/14024; B41J 2/155
See application file for complete search history.

(56) References Cited

U.S. PATENT DOCUMENTS

| | | | |
|---|---|---|---|
| 6,471,335 | B1 | 10/2002 | Gelbart |
| 2004/0085394 | A1 | 5/2004 | Martin |
| 2010/0214350 | A1 | 8/2010 | Oguchi |
| 2012/0019592 | A1 | 1/2012 | Chang |

*Primary Examiner* — Jannelle M Lebron
(74) *Attorney, Agent, or Firm* — PERKINS COIE LLP

(57) ABSTRACT

Techniques and mechanisms are described that enable the mounting of multiple print heads side by side to create a stable single line wide printing width that is suitable at least for single pass and wide format scan printers.

16 Claims, 6 Drawing Sheets

SIDE MOUNTING FOR S-SHAPED PRINT HEADS

TECHNICAL FIELD

The innovation relates generally to the field of print heads. More specifically, this innovation relates to a method and apparatus for a side mounting device and process that allows a mounting support to hold an S-shaped print head from one side of such print head.

BACKGROUND

Inkjet printing is a printing type that recreates a digital image by depositing droplets of ink onto a substrate, such as paper or plastic. Many contemporary inkjet printers use drop-on-demand (DOD) technology to force droplets of ink from a reservoir through a nozzle onto the substrate. Accordingly, the mounting and positioning of the reservoir and nozzle, among other components, is an aspect of accurately depositing ink in the desired position. Together, these components form a print head, also referred to as a print head assembly or print beam.

It is desirable to place the print heads accurately above the substrate to be printed, to ensure high quality printing. Print head placement and mounting is an important component of an inkjet printer. Even small errors can result in poor printing quality, particularly if multiple sources of error combine to negatively affect positioning of the droplets on the substrate.

The physical position of the print head typically is controlled by tight-tolerance machined components, an adjustment mechanism, or both. Precise surfaces are present on the print head that are called or referred to as reference surfaces or datum surfaces. A reference surface is a surface on the print head body with a precise distance and orientation to the print head nozzles. Reference surfaces are used to position a print head precisely in a printing apparatus, whereby print head references contact equally precise features on the printing apparatus (the printing apparatus reference surfaces). Two or more reference surfaces are required for each print head and are manufactured in the print head body by the print head manufacturer. Print head references are known to have very tight tolerances with respect to a nozzle's position. Print head reference surfaces have tolerances of a few microns with respect to the print head nozzles, typically, +/−5μ to +/−10μ. When used in combination with tight-tolerance machined components, an adjustment mechanism, or both, on the printer side, precise location of the nozzles can be achieved. The precision with which a print head is placed depends on the application. Higher quality printing typically needs a tolerance of +/−10μ. This value is a combination of the tolerances of the print head reference surfaces and the tolerances of the printing apparatus reference surfaces.

Each print head has a limited number of nozzles, each ejecting ink to form a single droplet on the substrate. To print a wide substrate or increase productivity, multiple print heads are used to create a wider line of nozzles than typically possible with a single print head.

Due to mechanical constraints wide substrate printing with multiple print heads typically is achieved by overlapping each print head with the next with a brick-like scheme. Such method, widely adopted in the industry, requires a lot of space because of the staggered layout.

Print head suppliers have designed S-shaped print heads to allow interlocking print heads that do not require the above-mentioned brick-like scheme of overlapping each print head with the next and with the staggered layout. In contrast, S-shaped print heads create a continuous print by allowing one print head to overlap with the next without being staggered. Such configuration allows for much more compact printers.

The standard mounting method for mounting a typical print head is onto a flat plane, hereafter called jetplate, using mounting screws, or an equivalent attachment mechanism, located on both sides of the print head. However, by desiring a continuous line of nozzles without gaps or with very little space between one print head and the next, such as with a plurality of S-shaped print heads, the resulting component (e.g., the jetplate) to which the print heads attach is required to be hollow along the entire length of the print array to accept or accommodate the plurality of S-shaped print heads. The flat plane (also referred to as the jetplate or plate) 101 for brick-like print heads is strong, because of the amount of material between one hole 104 and the next. In contrast, the jetplate 201 for S-shaped print heads has a continuous hole (e.g., as shown between 205 and 206) that spans the entire print head array. This continuous hole weakens the plate. The hollow shape within the jetplate 201 can be considered an intrinsic result of the design of the S-shaped print heads. In accordance with some embodiments herein, it is to be understood that the plates 101 and 201 are not provided by the print head manufacturers but are designed or provided by the printer's manufacturers (e.g. by Electronics for Imaging, Inc., Fremont CA ("EFI")).

It has been found that short arrays of S-shaped print heads can be mounted with the standard mounting scheme. As an example, three to four print heads are each a short array that can be mounted with a similar approach as shown in FIG. 2. However, longer arrays result in the lack of strength and thus manufacturing precision of the resulting plate. For example, typical longer arrays can be six print heads for a large scanning machine, 15 print heads for a very large scanning machine, 20 print heads for a small single pass machine, and up to 50 print heads for a very wide single pass machine. As mentioned above, with little space left between one print head and the next, the mounting support for accommodating such longer arrays can be hollow and flimsy and also with no material connecting the two sides (e.g., 205 and 206 of FIG. 2). As shown in FIG. 2, a jetplate 201 for S-shaped print heads can be considered as two long parallel beams (e.g., 205 and 206) with no material between them.

Therefore, industrial printer manufacturers face two problems. First, the mounting support for S-shaped print heads is weaker when a higher number of print heads is to be mounted due to at least the intrinsic constraint of the two unconnected sides of the mounting support. Second, the tight-tolerance machined components manufactured or attached to the mounting support, referred to herein as reference surfaces, which serve to place with precision each print head, cannot be manufactured at the required tolerances due to the mounting support weakness.

SUMMARY

The disclosed embodiments include a method for mounting S-shaped print heads using one side of the print head. This allows the manufacture of a stronger mounting support that solves at least the highlighted problems and drawbacks of the standard mounting scheme.

One disclosed method allows access to one side of the print head, i.e. the side that is not attached to the mounting support, for maintenance and assembly.

One disclosed mounting method can include a mechanical component attached to the print head also referred to herein as a brace. Such brace can be attached to the print head with screws, using attachment points on the frame of the print head or new attachment points manufactured on the print head frame and/or other parts of such print head.

The brace can be designed for attaching the print head on a surface of the printer in either or both the horizontal and the vertical plane, thus holding the print head to the printer.

Such brace can also be attached to the print head with glue, screws, or other means of attachment that are common to the industry. Other means of attachment can include nails, bolts, detachable clips, loop and hook fasteners, adhesives, or other suitable fasteners.

Such brace can include new reference surfaces for the print head, precisely located with respect to the printing nozzles. The original reference surfaces of the print head are designed by the print head manufacturer, thus constraining the method in which a print head can be mounted, i.e. on a flat plate. By attaching a brace to said print head, the printer manufacturer can replace in part or wholly the original reference surfaces so as to place them according to their needs.

The new references can be located by means of optical or mechanical alignment with tolerances surpassing those of the original print head and a location more suited for the disclosed mounting scheme.

This Summary is provided to introduce a selection of concepts in a simplified form that is further described below in the Detailed Description. This Summary is not intended to be used to limit the scope of the claimed subject matter. Other aspects of the disclosed embodiments will be apparent from the accompanying Figures and Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Inkjet printing is a printing type that recreates a digital image by depositing droplets of ink onto a substrate, such as paper, plastic or textile. Many contemporary inkjet printers use drop-on-demand (DOD) technology to force droplets of ink from a reservoir through a nozzle onto the substrate. The device for implementing DOD technology is called a print head.

A print head includes a frame made of a plurality of materials and parts that houses the electronics, the ink system, and the nozzles. The electronics drive the nozzles, while the ink system delivers the ink to the nozzles. Ink is delivered to the target substrate as droplets through the nozzles and makes up the dots that form the printed image. Each drop is considered a pixel on the substrate. Accordingly, a nozzle's position with respect to other nozzles of the print head, with respect to the substrate, and with respect to the nozzles of other print heads must be precise within tolerances of a few microns. This can be important when more than one print head per color is employed.

In recent years, one main developmental drive has been to increase productivity. Productivity is measured in how many meters square the printer can print in a set amount of time. One way to increase productivity is to use more than one print head per color. The print head is much like a paint brush—if two or more print heads are assembled side by side with precision, the resulting stroke is wider and thus productivity increases. Another reason to increase the number of print heads per color is to print a wider substrate in single pass applications, where the printable width is the width of the combined print heads' width.

Discussed herein are two types of inkjet print heads: brick-shaped and S-shaped.

Figure 1:
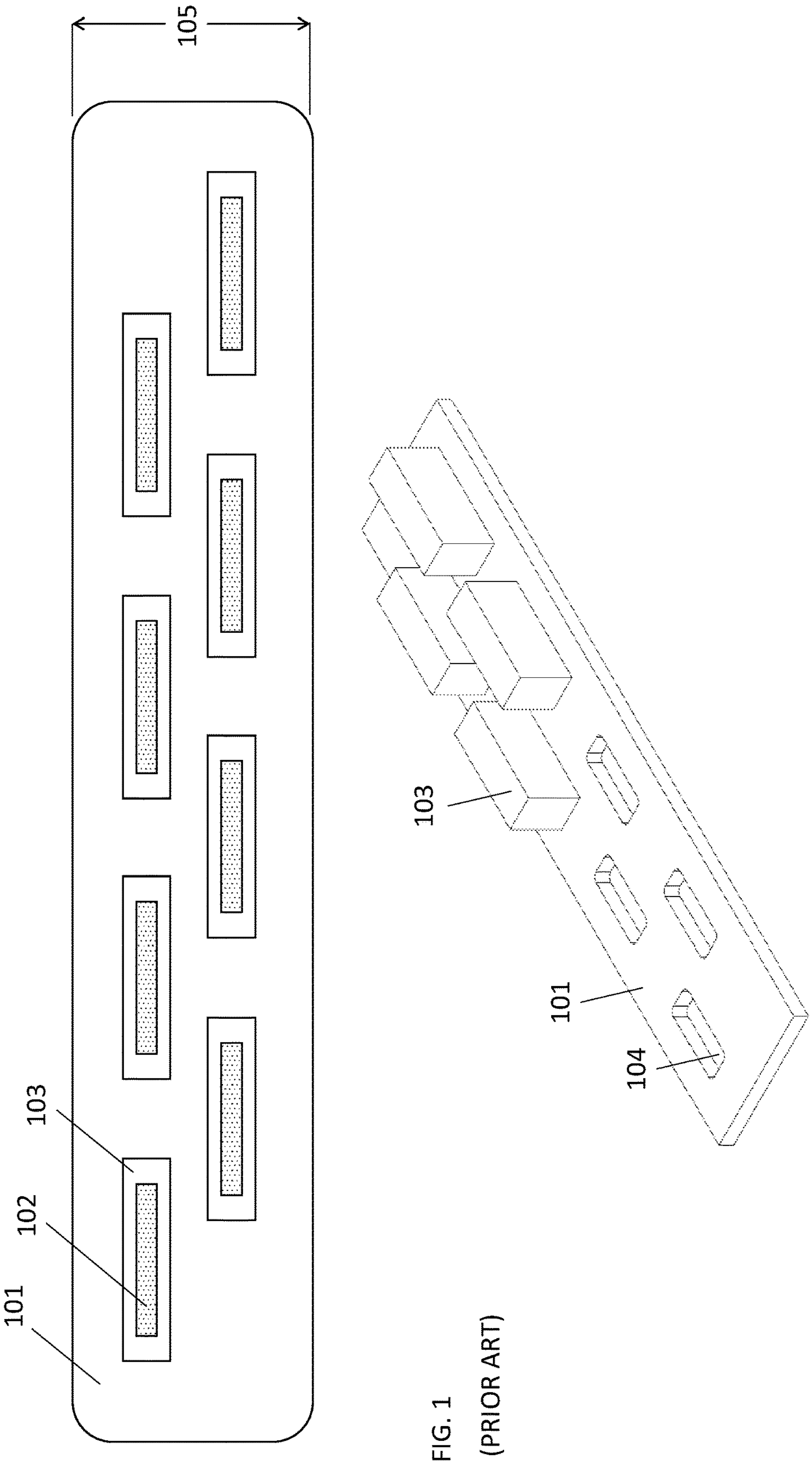
FIG. 1 (PRIOR ART)
FIG. 1 is a schematic diagram showing an example of an array of brick-shaped print heads mounted with brick-like overlap and staggered layout, according to the prior art.

Brick-shaped print heads do not interlock together. To assemble more than one print head for color, brick-shaped print heads must be staggered. FIG. 1 shows an example of brick-shaped print heads mounted with brick-like overlap, according to the prior art. Each print head 103 has a limited number of nozzles 102. To print a wide substrate or increase productivity one uses multiple print heads to create a wider line of nozzles than possible with a single print head. The mounting support can be a flat plate 101 with staggered holes 104 and mounting features (not shown) that allow to position the print heads precisely within the acceptable tolerances with respect to one another. Mounting features can include but are not limited to tight-tolerance machined components that act as reference surfaces; precisely placed pins that act as reference surfaces; an alignment mechanism that allows to precisely (within acceptable tolerances) move the print heads to the correct position; and a combination of the above. With staggered brick-shaped print heads, the total width 105 of the mounting support 101 is larger than what is achievable with S-shaped print heads. Such total width can have negative effects on the performance of the machine, affecting cost, productivity, and quality. However, the mounting support 101 is strong and can be made to accommodate a wide array of print heads without buckling.

S-shaped print heads can be designed by print heads manufacturers to interlock with each other, forming a continuous line without the need to be staggered. S-shaped print heads create a continuous print by allowing one print head to overlap with the next without being staggered. This allows for much more compact printers.

Figure 2:
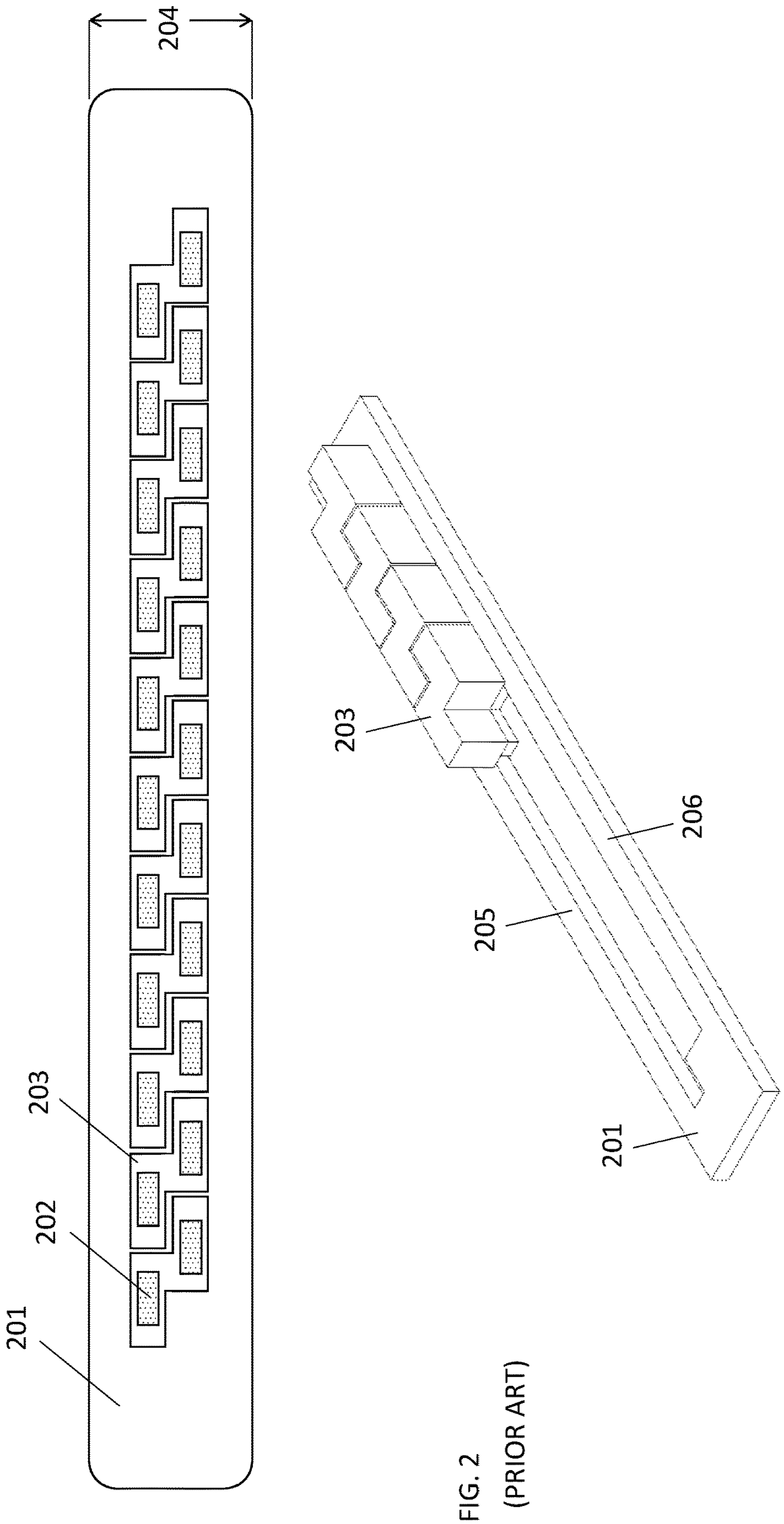
FIG. 2 (PRIOR ART)
FIG. 2 is a schematic diagram showing a standard mounting of an array of S-shaped print heads, according to the prior art.

FIG. 2 shows an example of a standard mounting of an array of S-shaped print heads, according to the prior art. Each print head 203 overlaps the next one with its S shape. The nozzles 202 form a continuous line without the need to stagger the print heads. The resulting mounting support 201 can be much narrower 204 than the support for the brick-shaped print heads but has been found to be much harder to manufacture and less structurally sound. Due to the inherent shape used in supporting the line of S-shaped print heads, it has been found a problem or sometimes not possible to use such design for wide print arrays. The structure of the mounting support is weaker the more print heads are aligned, to a point where such structure can be too weak to support any more print heads. For example, it has been found that such mounting configuration is not suited for a print width of more than three print heads. Structurally, the single continuous line of nozzles weakens the mounting support or jetplate resulting in bending and instability of the mounting support. For much the same reasons, it has been found challenging to manufacture precise tolerances in the jetplate, which can be too weak and hollow to allow precise manufacturing.

Figure 3:
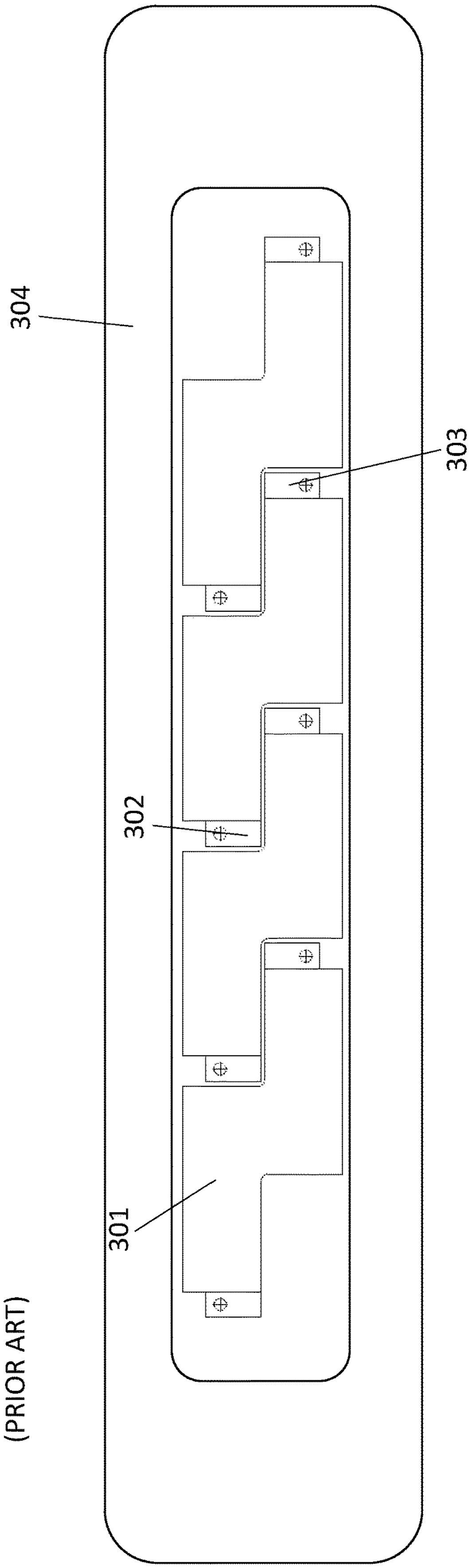
FIG. 3 (PRIOR ART)
FIG. 3 is a schematic diagram showing an array of S-shaped print heads from the viewpoint of above, according to the prior art.

FIG. 3 shows an array of S-shaped print heads 301 as seen from above and according to the prior art. The standard mounting attachment points 302 and 303 reside on opposite sides of the print head 301. With no space for the mounting support 304 to cross or otherwise support the print head array, the resulting mounting support 304 can be hollow and weak.

The present innovation proposes a method and apparatus to allow or provide compact and structurally sound mounting supports by using one side of an S-shaped print head (e.g., such as a commercially available S-shaped print head) to hold the print head to the printer body. Such innovation is achieved by attaching to the print head a novel component, called or referred to as a brace, that effectively relocates the original attachment points 302 and 303 (or effectively reassigns or replaces such attachment points) to new attachment points on the component or brace itself.

In an embodiment, the brace is configured to abut the S-shaped print head and abut the mounting support, thereby securing the S-shaped print head for mounting at a single point of attachment.

Figure 4:
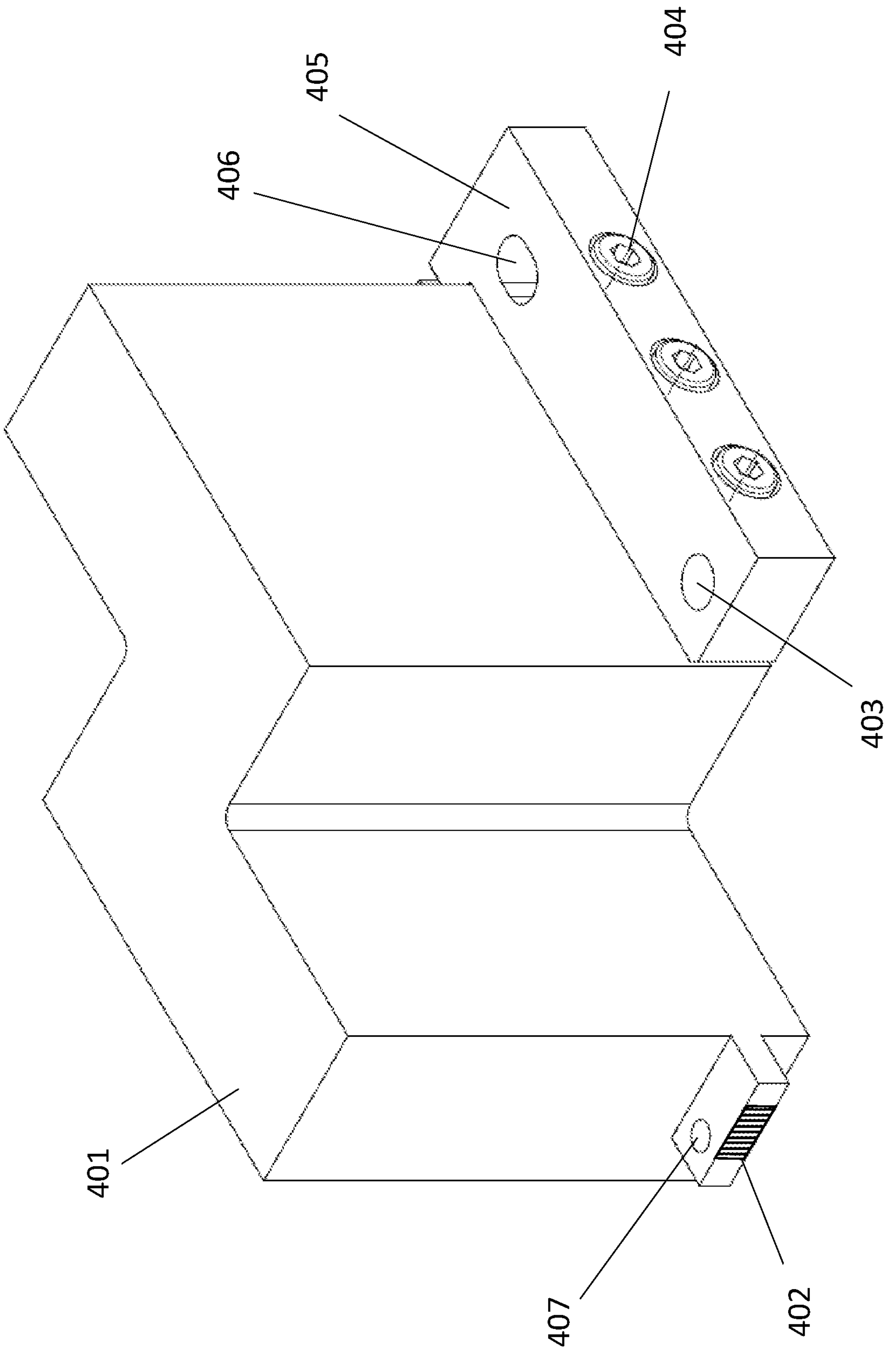
FIG. 4 is a schematic diagram showing an example of a brace attached to one side of the print head, according to an embodiment.

An embodiment can be understood with reference to FIG. 4, a schematic diagram showing an example of a brace 405 attached to one side of the print head 401. In this embodiment, the brace 405 is attached to the print head 401 with screws 404. In an embodiment, the screw 404 has two or more threads. In accordance with embodiments herein, two or more screws are sufficient to told brace 405 in place. In another embodiment, one screw together with a mechanism to prevent rotation of the brace also works. Examples include a screw and a pin or a screw and a bayonet mount. The original attachment point 407 is left unused. New attachment points 403 and 406 are located on the brace 405 and allow the print head 401 to be held on such one side. The shape and attachment method of the brace 405 are not limited to this embodiment. The brace 405 may be attached in a different manner, including but not limited to using glue on the side of the print head. Other attachment methods may include the use of screws, pins or a type of clamp that tightens around the print head. The shape of the brace 405 may be tailored for the specific application and shape of the mounting support. Examples of different shapes can be seen in FIG. 6A-C, component 603.

Figure 5:
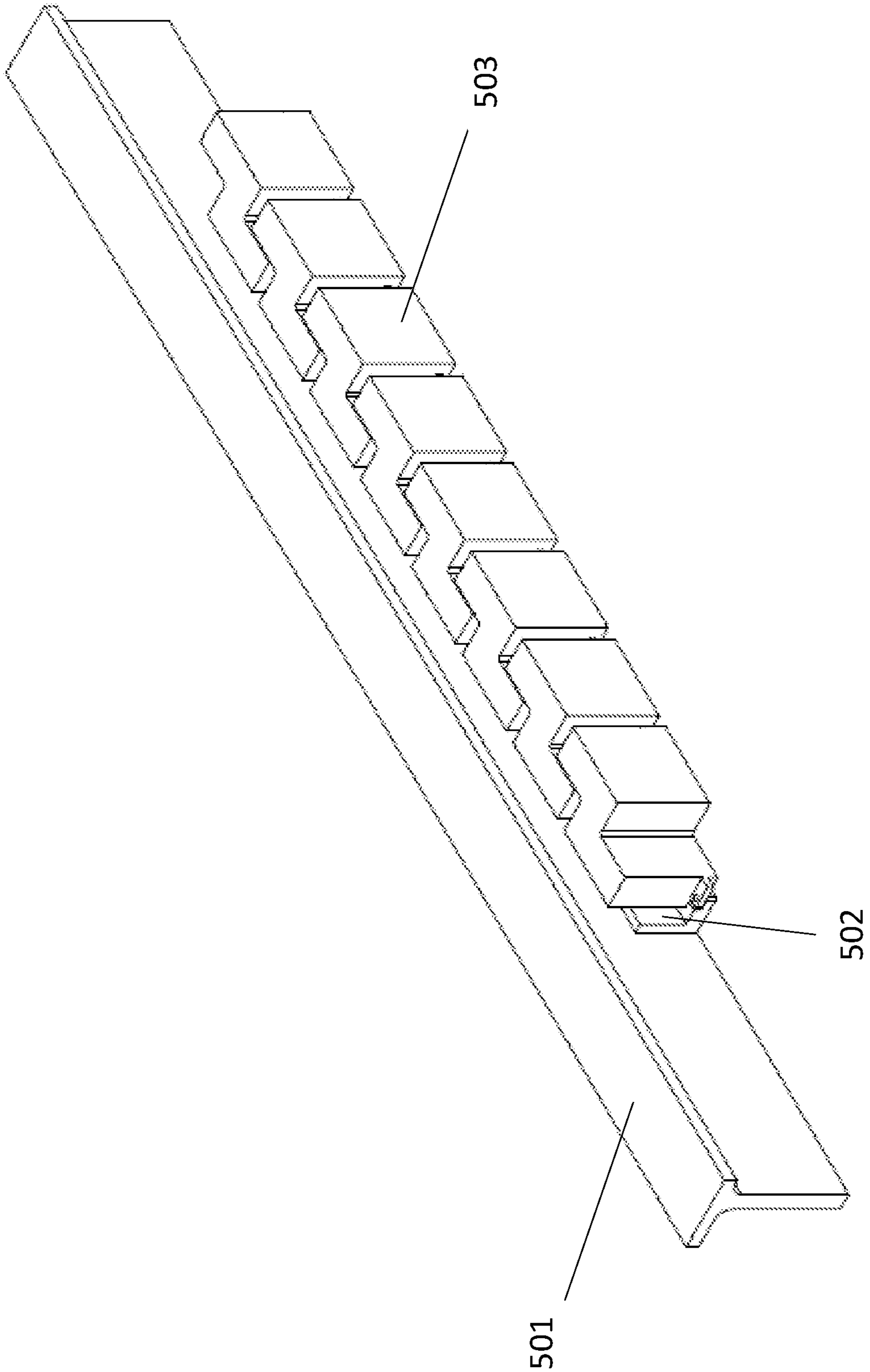
FIG. 5 is a schematic diagram showing an example of an array of S-shaped print heads assembled each with their respective brace, according to an embodiment.

An embodiment can be understood with reference to FIG. 5, a schematic diagram showing an example of an array of S-shaped print heads 503 each print head assembled with their respective brace 502 of the innovation. In this embodiment the mounting support is a T shaped beam 501. By enabling the mounting support to hold each print head 503 on only one side of each print head 503, the strength of the mounting support 501 is not dependent on the length of the array of heads. For example, adding more print heads to mounting support 501 does not make such support flimsy or unstable. By using such vertical mounting support in place of the prior art flat plate, the mounting support 501 can be sized accordingly to hold the desired number of print heads with minimal bending. In accordance with an embodiment, it should be appreciated that one skilled in the art can allow a certain amount of bending and can compensate for such bending by attaching the innovative print heads 503 and braces 502 on a flat plane, regardless of the bend in support 501, which is not possible with the standard flat plate jetplate of FIG. 2. Thus, the innovative configuration improves at least the reliability and efficiency of mounting a large array of print heads, by making it possible to manufacture a compact and high strength mounting support regardless of the number of print heads.

Figure 6A:
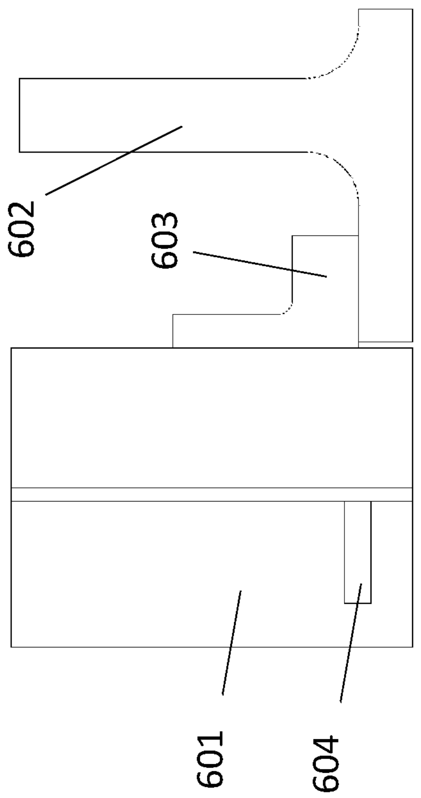
FIG. 6A-C are each a schematic diagram showing an example of respectively different mounting schemes using the brace, according to an embodiment.
Figure 6B:
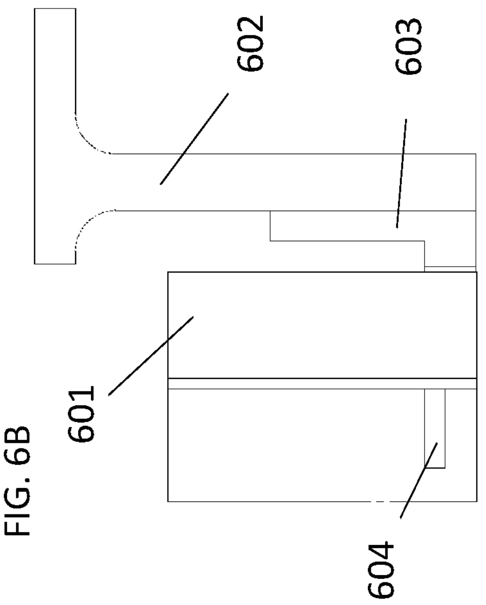
Figure 6C:
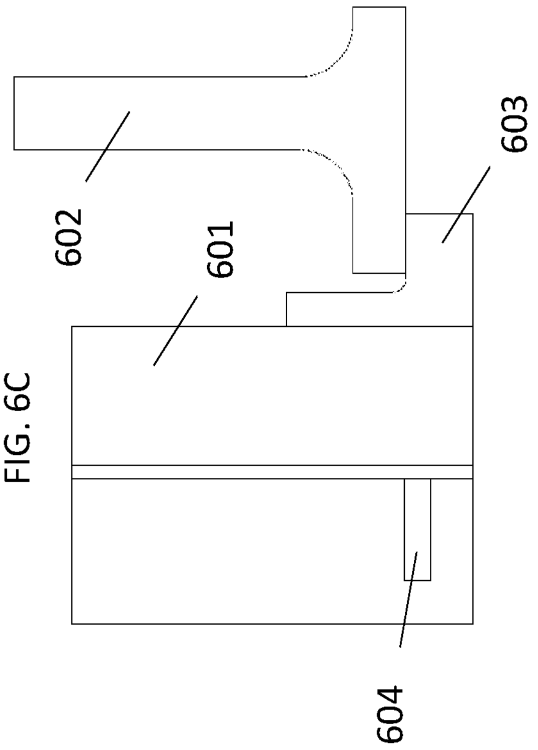

FIGS. 6A-6C are each a schematic diagram of an example of a different mounting scheme available with the proposed method and apparatus. Element 601 is the print head and element 604 is the original attachment point that is left unused in this embodiment, similarly to element 407 as discussed above. In accordance with embodiments herein, the brace 603 may have different shapes to allow the print head 601 to be attached from different areas such as but not limited to from above the mounting support 602, e.g. as shown in FIG. 6A; from below the mounting support 602, e.g. as shown in FIG. 6C; or from the side of the mounting support 602, e.g. as shown in FIG. 6B. In accordance with embodiments herein, the shape of the brace 603 might be identical in each of FIG. 6A-6C, whereas the print head placement can be different. Thus, the innovative brace 603 can have different mounting features (not shown) to allow mounting the print head from above (FIG. 6A) or below (FIG. 6B), for example. While the brace can have different shapes, its purpose is the same: to provide a new attachment point that allows the printer manufacturer to hold and secure the print head on one side, with the other side of the print head left hanging or accessible. The mounting support 602 may also have different shapes such as but not limited to a flat plate or a vertical bar, such as the T shaped beam 501 described in FIG. 5. The brace 603 may be attached to the mounting support 602 in a number of ways, including but not limited to screws and glue. Typical materials include but are not limited to stainless steel, aluminum, and carbon fiber. Less common materials may include hard plastics.

The benefits of using a brace to hold the S-shape print head on one side are not limited to the improved design freedom of the mounting support. By leaving one side of the print head free or hanging, such part of the print head is more accessible than otherwise. For example, the innovative configuration allows assembly and maintenance of the print head to be performed far more easily than before. For instance, by having one side of the print head that is not used to hold the print head, e.g. as depicted in FIG. 5, the operator has free access to perform maintenance on the print head. In contrast, a design similar to FIG. 2 not only has some material 205-206 on both sides of the print heads 203, but would also need braces on the 205-206 beams to hold them in place. These braces would further limit accessibility. Thus, the innovation described herein improves accessibility to the print heads and their components.

Consistent with embodiments herein, new reference surfaces can be machined or attached to such brace (e.g., 405, 502, and 603) changing and improving the way the print head is mounted and localized on the printer. In one exemplary embodiment, the brace may be attached to the print head by means of mechanical or optical alignment to align the new reference surfaces to the nozzles of the print head. The use of a jig may be employed for such endeavors. Such new reference surfaces can be understood from FIG. 4. In an exemplary embodiment, the original reference surface 402 is left unused while new reference surfaces 403 and 406 are machined directly in the brace 405. In this example, the original reference surface 402 is flat, the new reference surfaces are a precision bore 403 and slot 406. This change in reference type allows to customize the mounting of print head 401 according to the needs of the printer manufacturer (e.g. Electronics For Imaging, Inc., Fremont, CA). In an embodiment, the original reference surfaces 402 may be used to align the brace 405 to print head 401 in the absence of an optical jig. Furthermore, the original reference surface 402 may be used in part or wholly when attaching the print head to the printer. They may also be completely replaced such as shown in the example of FIG. 4. Thus, in accordance with embodiments herein, the printer manufacturer can further customize the brace with an auxiliary function, e.g. providing reference surfaces, in addition to the function of holding the print head on just one side.

Conclusion

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. An apparatus for side-mounting an S-shaped print head onto a mounting support of a printing machine, comprising:

a brace configured to:

abut the S-shaped print head; and abut the mounting support;

thereby securing the S-shaped print head for mounting at a single point of attachment;

wherein the brace comprises one or more reference surfaces, the one or more reference surfaces intended for controlling the placement of the S-shaped print head by being accurately located with respect to the printing nozzles, thereby allowing a print manufacturer effectively to replace in part or wholly one or more original reference surfaces of the S-shaped print head;

wherein the one or more reference surfaces are created and located on the brace using optical or mechanical alignment processes or are machined directly in the brace;

wherein the reference surfaces are located with tolerances surpassing tolerances of one or more original reference surfaces on the S-shaped print head; and wherein the location is suitable for mounting the S-shaped print head to the mounting support.

2. The apparatus of claim 1, wherein the brace is abutted to the S-shaped print head by being attached to the S-shaped print head by optical or mechanical alignment, the alignment directly targeted at printing nozzles of the S-shaped print head.

3. The apparatus of claim 1, wherein the mounting support can hold with stability an array of S-shaped print heads, the array comprising three or more S-shaped print heads.

4. The apparatus of claim 1, wherein the brace is abutted to the S-shaped print head by being attached to the S-shaped print head using one or more attachment points on the S-shaped print head or using one or more attachment points on the brace.

5. The apparatus of claim 1, wherein the brace is configured to attach the S-shaped print head onto a surface of the printing machine in either or both a horizontal and a vertical plane, thereby holding the S-shaped print head to the printing machine.

6. The apparatus of claim 1, wherein the brace is abutted to the S-shaped print head by being attached to the S-shaped print head with any of or any combination of:

glue, one or more screws, one or more nails, one or more bolts, one or more detachable clips, one or more loop and hook fasteners, an adhesive, or other suitable fasteners.

7. The apparatus of claim 1, wherein the brace is abutted to the S-shaped print head by being attached to the S-shaped print head with one screw together with a mechanism to prevent rotation of the brace.

8. The apparatus of claim 1, wherein the brace is abutted to the S-shaped print head by being attached to the one side of the S-shaped print head.

9. The apparatus of claim 1, wherein the brace is abutted to the S-shaped print head by being attached to the bottom of the mounting support or to a top surface of the mounting support or to the side of the mounting support.

10. The apparatus of claim 1, wherein the brace is attachable to the mounting support using one or more screws or glue.

11. The apparatus of claim 1, wherein the one or more original reference surfaces are used to align the brace to the S-shaped print head.

12. A method for side-mounting an S-shaped print head onto a mounting support of a printing machine, the method comprising:

attaching a brace to one side of an S-shaped print head; and mounting the S-shaped print head to a mounting support of a printing machine on the one side of the S-shaped print head by attaching the brace to the mounting support;

wherein the brace comprises one or more reference surfaces, the one or more reference surfaces intended for controlling the placement of the S-shaped print head by being accurately located with respect to the printing nozzles, thereby allowing a print manufacturer effectively to replace in part or wholly one or more original reference surfaces of the S-shaped print head;

wherein the one or more reference surfaces are created and located on the brace using optical or mechanical alignment processes or are machined directly in the brace;

wherein the reference surfaces are located with tolerances surpassing tolerances of one or more original reference surfaces on the S-shaped print head; and wherein the location is suitable for mounting the S-shaped print head to the mounting support.

13. The method of claim 12, wherein the brace is attached to the bottom of the mounting support or to a top surface of the mounting support or to the side of the mounting support.

14. The method of claim 12, wherein the brace is attached to the S-shaped print head by optical or mechanical alignment, the alignment directly targeted at printing nozzles of the S-shaped print head.

15. The method of claim 12, wherein the brace is configured to attach the S-shaped print head onto a surface of the printing machine in either or both a horizontal and a vertical plane, thereby holding the S-shaped print head to the printing machine.

16. The method of claim 12, wherein the one or more original reference surfaces are used to align the brace to the S-shaped print head.

* * * * *